(12) United States Patent
Ding et al.

(10) Patent No.: US 8,514,784 B2
(45) Date of Patent: Aug. 20, 2013

(54) METHOD FOR PROCESSING DOWNLINK SIGNAL IN SECTOR PORTION AND BASE STATION THEREOF

(75) Inventors: Jiewei Ding, Guangdong (CN); Yibin Zhai, Guangdong (CN)

(73) Assignee: ZTE Corporation, Guangdong (CN)

( * ) Notice: Subject to any disclaimer, the term of this patent is extended or adjusted under 35 U.S.C. 154(b) by 328 days.

(21) Appl. No.: 13/060,766

(22) PCT Filed: Aug. 27, 2008

(86) PCT No.: PCT/CN2008/072170
§ 371 (c)(1),
(2), (4) Date: Feb. 25, 2011

(87) PCT Pub. No.: WO2010/022556
PCT Pub. Date: Mar. 4, 2010

(65) Prior Publication Data
US 2011/0149823 A1   Jun. 23, 2011

(51) Int. Cl.
*H04W 4/00* (2009.01)
(52) U.S. Cl.
USPC ........................................ 370/328; 455/422.1
(58) Field of Classification Search
USPC .......................... 370/310–350; 455/403–466
See application file for complete search history.

(56) References Cited

U.S. PATENT DOCUMENTS

| | | | |
|---|---|---|---|
| 5,596,333 A * | 1/1997 | Bruckert | 342/457 |
| 5,809,401 A * | 9/1998 | Meidan et al. | 455/63.3 |
| 5,991,630 A | 11/1999 | Charas | |
| 6,011,787 A | 1/2000 | Nakano et al. | |
| 6,388,998 B1 * | 5/2002 | Kasturia | 370/320 |
| 7,120,467 B2 | 10/2006 | Umesh et al. | |
| 8,134,967 B2 * | 3/2012 | Hason et al. | 370/329 |
| 2004/0092289 A1 * | 5/2004 | Yamada et al. | 455/560 |
| 2005/0266799 A1 * | 12/2005 | Hara et al. | 455/63.4 |
| 2006/0154667 A1 * | 7/2006 | Seo et al. | 455/446 |

FOREIGN PATENT DOCUMENTS

| | | |
|---|---|---|
| CN | 1166259 A | 11/1997 |
| CN | 1523778 A | 8/2004 |
| CN | 1992956 | 7/2007 |
| CN | 101031127 | 9/2007 |
| CN | 101137185 A | 3/2008 |
| JP | 2007189349 A | 7/2007 |

OTHER PUBLICATIONS

International Search Report for PCT/CN2008/072170, Completed by the Chinese Patent Office on May 20, 2009, 4 Pages.

* cited by examiner

*Primary Examiner* — Ricky Ngo
*Assistant Examiner* — Wei-Po Kao
(74) *Attorney, Agent, or Firm* — Brooks Kushman P.C.

(57) ABSTRACT

A method and an apparatus for processing downlink signals in different sectors, which may be applied in processing downlink signals in a one or more sectored cell. The method and apparatus may include a Node B determining a sector where a mobile terminal, which has built a wireless link with the Node B, is located based on a current connection. The method and apparatus may allow Node B to separately schedule resources of the one or more sectors in the cell, and for one or more mobile equipment which has built a wireless link with the Node B. The method and apparatus allows Node B transmitting of downlink signals to this mobile terminal only in the sector where the mobile terminal locates currently, while processing downlink signals in different sectors. The method and apparatus can reduce downlink transmission power and improve network coverage quality.

7 Claims, 3 Drawing Sheets

| Sector 1 | Sector 2 | Sector 3 |
|---|---|---|
| The downlink signals to the UE3 are transmitted in three sectors ||| 
| The downlink signals to the UE2 are transmitted in three sectors ||| 
| The downlink signals to the UE1 are transmitted in three sectors |||

| Sector 1 | Sector 2 | Sector 3 |
|---|---|---|
| | The downlink signals to the UE2 are transmitted in the sector 2 | The downlink signals to the UE3 are transmitted in the sector 3 |
| The downlink signals to the UE1 are transmitted in the sector 1 and the sector 2 | | |

FIG. 4 (b)

| Sector 1 | Sector 2 | Sector 3 |
|---|---|---|
| Spare resources | Spare resources | The downlink signals to the UE3 are transmitted in the sector 3 |
| Spare resources | The downlink signals to the UE2 are transmitted in the sector 2 | Spare resources |
| The downlink signals to the UE1 are transmitted in the sector 1 | Spare resources | Spare resources |

FIG. 5 (a)

| Sector 1 | Sector 2 | Sector 3 |
|---|---|---|
| The downlink signals to the UE1 are transmitted in the sector 1 | The downlink signals to the UE2 are transmitted in the sector 2 | The downlink signals to the UE3 are transmitted in the sector 3 |

FIG. 5 (b)

METHOD FOR PROCESSING DOWNLINK SIGNAL IN SECTOR PORTION AND BASE STATION THEREOF

CROSS-REFERENCE TO RELATED APPLICATION

This application is the U.S. national phase of PCT Appln. No. PCT/CN2208/072170 filed Aug. 27, 2008.

TECHNICAL FIELD

The present invention relates to a communication technology field, and particularly, to a method and a Node B for processing downlink signals in different sectors in wireless communication systems.

BACKGROUND OF THE RELATED ART

In a Wideband Code Division Multiple Access (WCDMA) wireless communication system, according to various requirements of network operations, there is currently an application that a cell is divided into a plurality of sectors, such as the Omni Transmission Sectorized Receive (OTSR) approach, in which downlink signals of one cell is transmitted in the whole cell, but uplink signals are received from a plurality of sectors. Because the uplink transmission power in the WCDMA system is limited, this application can implement larger network coverage in a flat area with lower cost, or more flexibly implement complex city coverage, reduce cell numbers, and simplify network configuration. This sectorization approach can improve uplink receiving performance and system capacity, and it is applied in the commercial network of the WCDMA release 99. Others, such as the cell portion approach defined in the 3rd Generation Partnership Project (3GPP) protocol and the simulcast approach in field, use the sectorization method as well.

In the wireless communication system, the power resource is a kind of pretty important resources. Usually, the total power transmitted in downlink by radio frequency systems is limited. In a Code-Division Multiple Access (CDMA) system, the extra power of a certain user may result in interference to other users. In the sectorization approach, downlink signals are transmitted by Node B antennae of a plurality of sectors. If normal OTSR or simulcast approaches are used, no matter how the mobile terminals (which are called user equipments (UEs) in the WCDMA, or mobile stations etc. in other systems, and are uniformly called mobile terminals in this text) are distributed in various sectors, the downlink signals transmitted by various sectors are exactly the same, the downlink throughput is equivalent to the throughput of one regular cell which is not sectored, downlink transmission power is also wasted a lot, and signal interference between users is resulted in. If the cell portion approach is used, although each sector can be processed separately, more signaling overhead is required, and the Radio Network Controller (RNC) is involved, hence the implementation is complicated.

The 3GPP protocol not only supports normal downlink dedicated channel services of different rates, but also introduces High-Speed Downlink Packet Access (HSDPA) services into the 3GPP release 5. The HSDPA services use a downlink shared channel, and its key technique is that a Node B needs to schedule downlink resources of the mobile terminals. Herein, the resources include downlink code channel resources of the HSDPA and downlink power resources. Usually, one cell has only one set of code channel resources pool and power resources pool, wherein code channel resources include the High-Speed Downlink Shared Channel (HS-DSCH) and the Shared Control Channel for HS-DSCH (HS-SCCH). The HS-DSCH belongs to downlinks, which is responsible for transmitting user data, and the code channel sharing approaches mainly are the time division multiplexing and the code division multiplexing; and the HS-SCCH belongs to downlinks, which is responsible for transmitting control information necessary for the HS-DSCH code channel decoding.

However, in the sectorization receiving approach, downlink signals are transmitted by Node B antennae of a plurality of sectors. If a normal OTSR approach is used, no matter how UEs are distributed in various sectors, the downlink signals transmitted by various sectors are exactly the same. The downlink throughput is equivalent to the throughput of one regular cell which is not sectored, the downlink transmission power is also wasted a lot, and signal interference between users is resulted in, which influences the cell coverage radius.

SUMMARY OF THE INVENTION

The technical problem to be solved in the present invention is to provide a method for processing downlink signals in different sectors, which can decrease the downlink transmission power, and improve network coverage quality.

To solve the above technical problem, the present invention provides a method for processing downlink signals in different sectors, applied in processing downlink signals in a sectored cell, and the method comprises:

a Node B determining a sector where a mobile terminal, which has built a wireless link with the Node B, locates currently; and the Node B separately scheduling resources of each sector in the cell, and for each mobile terminal which has built a wireless link with the Node B, the Node B transmitting downlink signals to the mobile terminal only in the sector where the mobile terminal locates currently.

Furthermore, the Node B determines a sector where a mobile terminal, which has built a wireless link with the Node B, locates currently in the following approach:

the Node B periodically searches for and demodulates signals of all sectors in the cell, and for each mobile terminal which has built a wireless link with the Node B, the Node B obtains information about the sector where the mobile terminal locates currently according to uplink demodulation information, and determines a sector in which uplink signals from the mobile terminal are obtained in latest as the sector where the mobile terminal locates currently.

Furthermore, if uplink signals from a certain mobile terminal are searched in one sector by the Node B, the sector is determined through this search as the sector in which the mobile terminal locates; if uplink signals from a certain mobile terminal are simultaneously searched in two sectors by the Node B, the two sectors are determined through this search as sectors in which the mobile terminal locates.

Furthermore, the node B maintains a code channel resources pool and a power resources pool for each sector, and separately scheduling code channel resources and power resources for each sector, wherein the same code channel resources are repeatedly allocated in different sectors.

Furthermore, via a downlink dedicated channel or a downlink shared channel, the Node B transmits downlink signals to the mobile terminal which has built a wireless link with the Node B; when the Node B transmits downlink signals to the mobile terminal via a downlink shared channel, the Node B allocates code channel resources and power resources for the mobile terminal in the sector where the mobile terminal locates currently at first, and then transmits downlink signals to the mobile terminal in the sector where the mobile terminal locates currently according to the allocated code channel resources and power resources.

Furthermore, a period of searching for and demodulating signals of all the sectors in the cell by the Node B is 10 to 200 milliseconds.

Another technical problem the present invention solves is to provide a Node B for processing downlink signals in different sectors, which can reduce downlink transmission power and improve network coverage quality.

To solve the above technical problem, the present invention provides a Node B for processing downlink signals in different sectors, comprising a downlink scheduling module and a signal transmitting module, wherein the downlink scheduling module is used for separately scheduling resources for various sectors in a cell, and comprises:

a sector location determining unit, which is used for determining a sector where a mobile terminal which has built a wireless link with the Node B locates currently; and a transmission sector selecting unit, which is used for, when transmitting downlink signals to the mobile terminal, taking the sector where the mobile terminal locates currently, determined by the sector location determining unit, as a downlink signal transmission sector, and informing the signal transmitting module;

the signal transmitting module is used for transmitting downlink signals to the mobile terminal in the downlink signal transmission sector of the mobile terminal.

Preferably, the Node B also comprises an uplink demodulating module, which is used for periodically searching for and demodulating signals of all the sectors in the cell, and for each mobile terminal which has built a wireless link with the Node B, the uplink demodulating module obtains information about a sector in which uplink signals from the mobile terminal locates according to uplink demodulation information, and transmits the information to the sector location determining unit of said downlink scheduling module; the sector location determining unit is used for determining a sector in which uplink signals from the mobile terminal are obtained in latest as the sector where the mobile terminal locates currently.

Preferably, in the downlink signals transmission sector of the mobile terminal, the signal transmitting module transmits the downlink signals to the mobile terminal via a downlink dedicated channel or a downlink shared channel.

Preferably, the downlink scheduling module also includes: a resources management unit, which is used for maintaining a code channel resources pool and a power resources pool for each sector, and separately scheduling code channel resources and power resources for each sector, wherein the same code channel resources are repeatedly allocated in different sectors; and a resources allocating unit, which is used for, when transmits downlink signals to a mobile terminal via a downlink shared channel, allocating code channel resources and power resources for the mobile equipment in the sector where the mobile terminal locates currently, and informing the signal transmitting module; after the signal transmitting module receives the code channel resources and power resources of the mobile terminal informed by the resource allocating unit, the signal transmitting module transmits downlink signals to the mobile terminal in the sector where the mobile terminal locates currently according to the allocated code channel resources and power resources.

The present invention determines transmission power and range according to uplink demodulation information. Downlink signals are transmitted only in parts of sectors of a cell, and each sector of one cell has one set of resources pool. When transmits signals to a UE via a downlink shared channel, the resources in which resources pool is used for the UE is determined by the information about the sector where the UE's signal locates. Thus, the present invention can not only improve network coverage quality, but also greatly promote HSDPA throughput. It greatly decreases downlink transmission power to improve network coverage quality and decrease signal interference between users.

BRIEF DESCRIPTION OF DRAWINGS

FIG. 4(*b*) is schematic diagram of resources allocation in one method of the present invention in the scenario of FIG. 3;

FIG. 5(*a*) is schematic diagram of resources allocation in one method of the present invention according to a scenario of another application example of the present invention;

FIG. 5(*b*) is schematic diagram of resources allocation in another method of the present invention in the same scenario as shown in FIG. 5(*a*).

PREFERRED EMBODIMENTS OF THE PRESENT INVENTION

The following will take implementation of the present invention used in the WCDMA system as an example to describe the present invention in details according to accompanying figures and embodiments. According to these accompanying figures, the person skilled in the art can easily implement the present invention, and can apply the same idea and method in other wireless communication systems, such as the CDMA, the LTE (3GPP Long Term Evolution), the LTE-Advance (the further evolution of the LTE), and so on.

Figure 1:
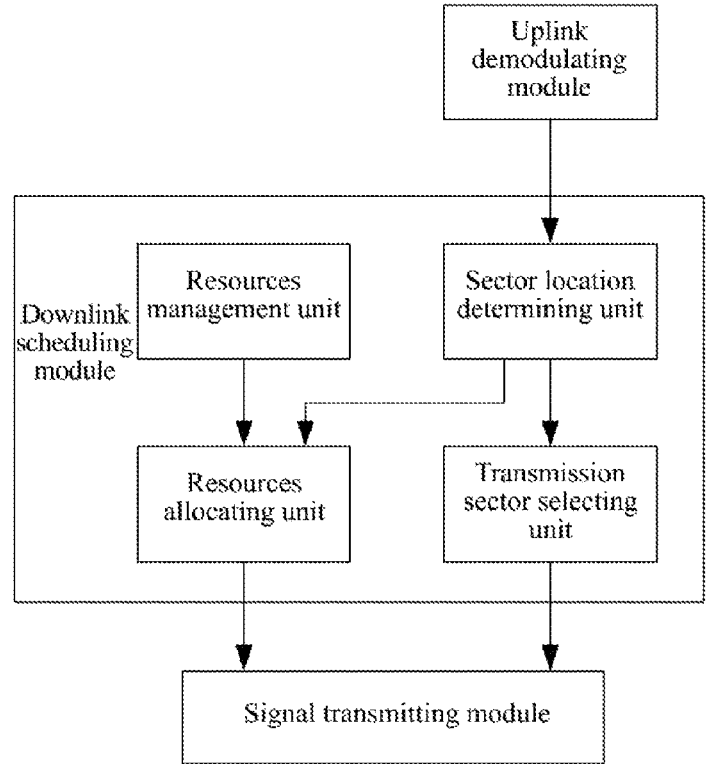
FIG. 1 is a module chart of a Node B for processing downlink signals in different sectors according to an embodiment of the present invention.

The Node B of this embodiment for processing downlink signals in different sectors is shown in FIG. 1, which includes an uplink demodulating module, a downlink scheduling module and a signal transmitting module, wherein the uplink demodulating module is used for periodically searching for and demodulating signals of all sectors in a cell, and for a mobile terminal which has built a wireless link with the Node B, the uplink demodulating module obtains the information of a sector where this mobile terminal's uplink signals locate according to the uplink demodulation information, and transmits the information to a sector location determining unit of the downlink scheduling module.

The downlink scheduling module is used for separately scheduling resources for various sectors in the cell, and further includes:

a sector location determining unit, which is used for determining the sector, in which this mobile terminal's uplink signal transmitted in latest by the uplink demodulation module is located, as the sector where this mobile terminal locates currently;

a transmission sector selecting unit, which is used for selecting a sector, determined by the sector location determining unit, as the sector where the mobile terminal currently locates, as a downlink signal transmitting sector of the mobile terminal when downlink signals are transmitted to the mobile terminal, and informing the signal transmitting module;

a resources management unit, which is used for maintaining one code channel resources pool and one power resources pool for each sector, and separately scheduling code channel resources and power resources of each sector, wherein the same code channel resources are allocated repeatedly in different sectors; and a resources allocating unit, which is used for allocating code channel resources and power resources for this mobile terminal in the sector where this mobile terminal currently locates when downlink signals are transmitted to the mobile terminal in downlink shared channel, and informing the signal transmitting module;

the signal transmitting module is used for transmitting downlink signals of this mobile terminal in the downlink signals transmission sector of this mobile terminal, such as in a downlink dedicated channel or in a downlink shared channel. If in the downlink shared channel, the signal transmitting module has to transmit the downlink signals of this mobile terminal in the sector where this mobile terminal currently locates according to allocated code channel resources and power resources after receiving the information from the resources allocating unit.

Figure 2:
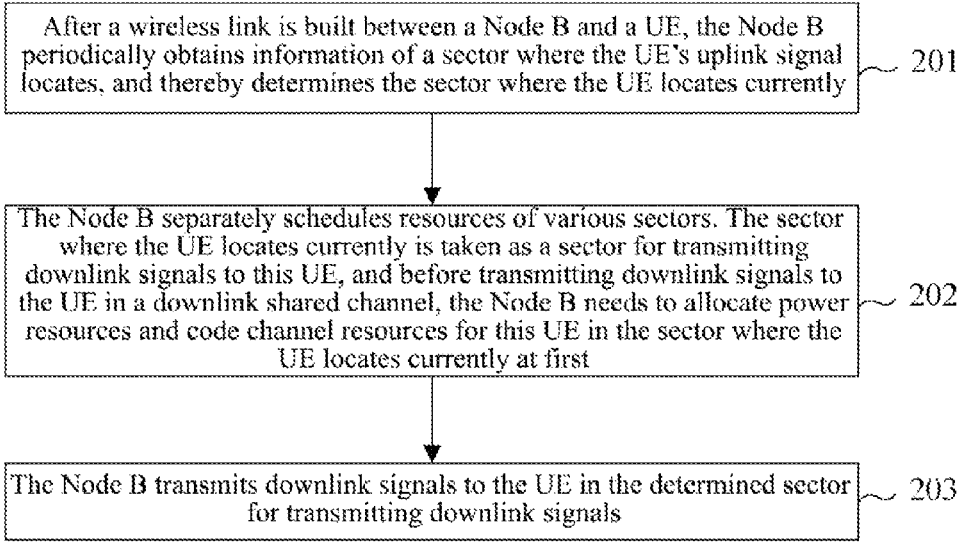
FIG. 2 is a flow chart of a method for processing downlink signals in different sectors according to an embodiment of the present invention.

FIG. 2 is the flow chart of a method for processing downlink signals in different sectors according to an embodiment of the present invention, and the steps of the method are as below:

Step 201: after a wireless link is built between a Node B and a UE, the Node B periodically obtains information of a sector where the UE's uplink signal locates, and thereby determines the sector where the UE locates currently;

In order to implement sectors handoff and obtain diversity gains, the Node B needs to periodically search and demodulate signals in all sectors, obtain the information of the sector where the UE's uplink signal locates (such as the sector number) according to uplink demodulation information, and determine the in latest obtained sector where the UE's uplink signal locates as a sector where the UE locates currently. This period can be 10 to 200 milliseconds.

The information of the sector where the UE's uplink signal locates may be the number of the sector where the UE locates.

Step 202: the Node B separately schedules resources of various sectors. The sector where the UE locates currently is taken as a sector for transmitting downlink signals to this UE, and before transmitting downlink signals to the UE in a downlink shared channel, the Node B needs to allocate power resources and code channel resources for this UE in the sector where the UE locates currently at first;

if merely in one sector are signals of a certain UE searched, it is indicated that this UE locates in this sector, and the downlink signals of this UE are only required to be transmitted in this sector according to the symmetry between the uplink signal transmission path and the downlink signal transmission path. If in two sectors are signals of a certain UE searched at the same time, then the downlink signals of this UE should be transmitted in these two sectors.

Code channel resources of a downlink dedicated channel are unique in a cell, and they do not change during communication process of the cell. When transmit downlink signals of the UE in a downlink dedicated channel, the sector where the UE locates currently can be just taken as the downlink signals transmission sector of this UE.

When transmit downlink signals to UEs in a downlink shared channel, it needs to dynamically allocate code channel resources and power resources among various UEs. The Node B maintains one code channel resources pool and one power resources pool for each sector, and separately schedules each sector. For a certain UE, the Node B allocates code channel resources and power resources for this UE in a sector where this UE locates currently, and the same code channel resources can be repeatedly allocated in different sectors.

For instance, one cell has N sectors, the code channel resources and power resources in such processing method are N times of one cell resources in regular processing method. According to regular processing method, the downlinks signals need to be transmitted in all sectors of the whole cell, however, in general, a UE only locates in one sector, thereby the transmission power of the other sectors are wasted. Using the method for transmission in different sectors of the present invention can greatly save power. In addition, the downlink code channel resources of the CDMA system are limited, and the HSDPA throughput of one cell is defined by code channel resources. In the method for transmission in different sectors, the same code channel resources can be multiplexed in different sectors, thereby the HSDPA throughput can increase exponentially.

Step 203: the Node B transmits downlink signals to the UE in the determined downlink signal transmission sector.

Different from the normal idea that resources management is centralized in radio network control equipments such as RNC for implementation, the idea of this embodiment is that the sector-orientated processing functions for the downlink signals (including scheduling, management and allocating resources and so on) are implemented in the Node B with radio network control equipments such as RNC uninvolved. Thus it is unnecessary to have the RNC configure sector information, and the Node B does not need to report the sector information to the RNC to schedule, which avoids large scale signaling interaction and longer handoff delay. Therefore, the above scheme that the Node B directly carries out sector-based process on downlink signals is simply implemented, has smaller handoff delay, and is suitable for industry application.

Figures 3, 4:
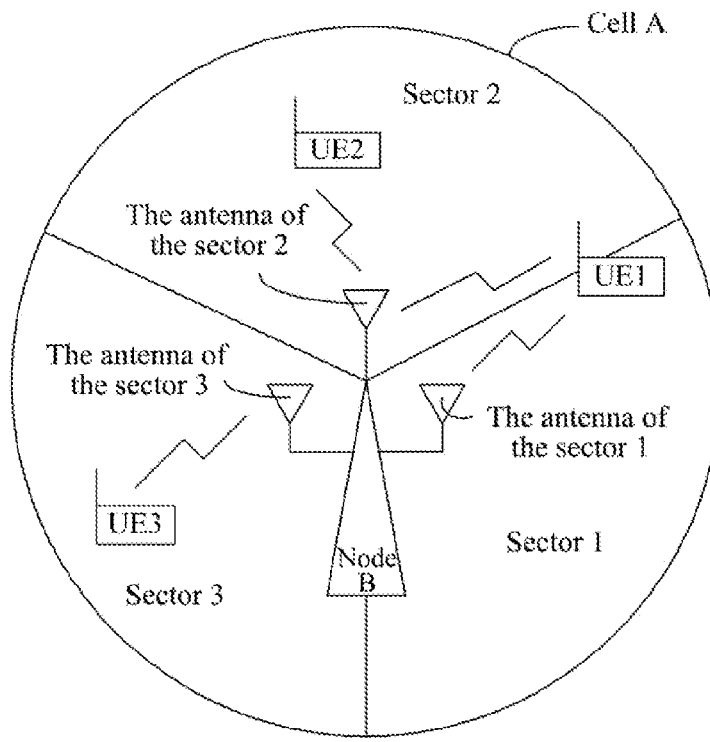
FIG. 3 is a schematic diagram of a scenario of an application example.
FIG. 4(*a*) is schematic diagram of resources allocation in regular method in the scenario of FIG. 3.

FIG. 3 is a schematic diagram of an application example of the present invention. In this example, the Node B serving cell A is composed of three sectors. All of three user equipments, namely UE1, UE2 and UE3 in the cell use the HSDPA service. The UE1 is located in the boundary of sector1 and sector2, and can receive the downlink signals from the sector1 and the sector2, and uplink signals from the UE1 can also be searched by these two sectors served by the Node B, namely, UE1 is under the coverage of the antenna of sector 1 and the antenna of the sector2; the UE2 is located in the sector2, and the UE3 is located in the sector3, namely, the UE2 is under the coverage of the antenna of the sector2 and the UE3 is under the coverage of the antenna of the sector3.

FIG. 4(a) is a schematic diagram of resource allocation in the regular method in the prior art based on the scenario shown in FIG. 3, where the downlink signals to the UE1, the UE2 and the UE3 are simultaneously transmitted in three sectors (a sector1, a sector2 and a sector3), therefore, only 1/3 code channel resources or power resources are allocated to each UE, and the signals of various users are interfered with one another. Under such situation, the downlink code channel of each UE cannot be shared in various sectors, and the throughput is low. Moreover, the downlink signals of each UE are simultaneously transmitted in all of three sectors, however, only signals transmitted from one or two sectors among the three sectors (for UE1) are received by the UE, which results in power waste. Power waste resulted from omni transmission is the same as for the UE using the downlink dedicated channels.

FIG. 4(b) is a schematic diagram of resource allocation in the present invention method based on the scenario of the FIG. 3, wherein the horizontal indicates three sectors (including the sector1, sector2 and sector3), and the vertical indicates code channel resources or power resources. If the method of the present invention is used, then resources can be allocated according to the approach of FIG. 3. The UE1 transmits downlink signals in two sectors, and occupies the same resources in the sector1 and sector2. The UE2 in the sector2 uses the rest resources of the sector2, and the UE3 in the sector3 can use all of the resources of the sector3. The more code channel resources are used, the higher the throughput can be achieved.

FIG. 5(a) is an effect drawing of one method for allocating resources according to the present invention in another exemplary application scenario. In this scenario, the downlink signals to the UE1 are transmitted in the sector1, the downlink signals to the UE2 are transmitted in the sector 2, and the downlink signals to the UE3 are transmitted in the sector3. Although the number of the code channels of each UE is the same as illustrated in FIG. 3(a), the downlink signals of each UE is transmitted in only one sector, thus 2/3 transmission power are saved and interference between users are reduced; moreover, for each sector, 2/3 code channel resources and power resources still can be used.

FIG. 5(b) is an effect drawing of another method for allocating resources according to the present invention in the above scenario. If the UE requires very high downlink speed, then resources can be allocated according to the method illustrated in FIG. 4(b). Wherein, each UE uses all the resources of each sector, i.e. the downlink signals to the UE1 use all the resources of the sector 1, the downlink signals to the UE2 use all the resources of the sector2, and the downlink signals to the UE3 uses all the resources of the sector3. The code channel number used by each UE is three times of that of the regular method, thereby its throughput can also be the three times of that of the regular method. Such as in the R6, the regular methods in prior art make the maximum throughput of one cell to be 14.4 Mbps; while using the cell sectored into three sectors according to the present invention, its maximum throughput is 43.2 Mbps.

The larger the transmission power for each user is, the better the coverage can be achieved. For example, according to regular methods, the coverage distance of one cell is 10 km, while according to the present invention method, the coverage distance is up to 13.8 km, and the coverage area is 1.9 times of that of the regular method.

According to the above analysis, the method of the present invention in the application in a sectored cell can considerably improve the resources utilization efficiency.

Industrial Applicability

The present invention can be applied in the WCDMA, CDMA, LTE, LTE-Advance systems and so on. The present invention can not only improve network coverage quality, but also greatly promote HSDPA throughput, greatly reduce downlink transmission power, and reduce signal interference between users as well. And it is simple to implement, and has smaller handoff delay.

What we claim is:

1. A method for processing downlink signals in different sectors, applied in processing downlink signals in a sectored cell, and the method comprising:

a Node B determining a sector where a mobile terminal, which has built a wireless link with the Node B, locates currently;

the Node B separately scheduling resources of each sector in the cell, and for each mobile terminal which has built a wireless link with the Node B, the Node B transmitting downlink signals to the mobile terminal only in the sector where the mobile terminal locates currently;

the Node B maintaining a code channel resources pool and a power resources pool for each sector, and separately scheduling code channel resources and power resources for each sector, wherein same code channel resources are repeatedly allocated in different sectors;

via a downlink dedicated channel or a downlink shared channel, the Node B transmits downlink signals to the mobile terminal which has built a wireless link with the Node B; and when the Node B transmits downlink signals to the mobile terminal via a downlink shared channel, the Node B allocates code channel resources and power resources for the mobile terminal in the sector where mobile terminal locates currently at first, and then transmits downlink signals to the mobile terminal in the sector where the mobile terminal locates currently according to the allocated code channel resources and power resources.

2. The method as claimed in claim 1, wherein the Node B determines a sector where a mobile terminal, which has built a wireless link with the Node B, locates currently in the following approach:

the Node B periodically searches for and demodulates signals of all sectors in the cell, and for each mobile terminal which has built a wireless link with the Node B, the Node B obtains information about the sector where the mobile terminal locates currently according to uplink demodulation information, and determines a sector in which uplink signals from the mobile terminal are obtained in latest as the sector where the mobile terminal locates currently.

3. The method as claimed in claim 2, wherein:

if uplink signals from a certain mobile terminal are searched in one sector by the Node B, the sector is determined through this search as the sector in which the mobile terminal locates;

if uplink signals from a certain mobile terminal are simultaneously searched in two sectors by the Node B, the two sectors are determined through this search as sectors in which the mobile terminal locates.

4. The method as claimed in claim 2, wherein:

a period of searching for and demodulating signals of all the sectors in the cell by the Node B is 10 to 200 milliseconds.

5. A Node B for processing downlink signals in different sectors, comprising:

a downlink scheduling module and a signal transmitting module, wherein the downlink scheduling module is used for separately scheduling resources for various sectors in a cell, and the downlink scheduling module includes:

a sector location determining unit, which is used for determining a sector where a mobile terminal which has built a wireless link with Node B locates currently;

a transmission sector selecting unit, which is used for, when transmitting downlink signals to the mobile terminal, taking the sector where the mobile terminal locates currently, determined by the sector location determining unit, as a downlink signal transmission sector, and informing the signal transmitting module;

a resources management unit, which is used for maintaining a code channel resources pool and a power resources pool for each sector, and separately scheduling code channel resources and power resources for each sector, wherein same code channel resources are repeatedly allocated in different sectors; and a resources allocating unit, which is used for, when transmits downlink signals to a mobile terminal via a downlink shared channel, allocating code channel resources and power resources for mobile equipment in the sector where the mobile terminal locates currently, and informing the signal transmitting module;

wherein the signal transmitting module is used for transmitting downlink signals to the mobile terminal in the downlink signal transmission sector of the mobile terminal;

wherein the signal transmitting module receives the code channel resources and power resources of the mobile terminal informed by the resource allocating unit, the signal transmitting module transmits downlink signals to the mobile terminal in the sector where the mobile terminal locates currently according to the allocated code channel resources and power resources.

6. The Node B as claimed in claim 5, further including:

an uplink demodulating module, which is used for periodically searching for and demodulating signals of all the sectors in the cell, and for each mobile terminal which has built a wireless link with the Node B, the uplink demodulating module obtaining information about a sector in which uplink signals from the mobile terminal locates according to uplink demodulation information, and transmitting the information to the sector location determining unit of the downlink scheduling module;

wherein the sector location determining unit is used for determining a sector in which uplink signals from the mobile terminal are obtained in latest as the sector where the mobile terminal locates currently.

7. The Node B as claimed in claim 5, wherein in the downlink signals transmission sector of the mobile terminal, the signal transmitting module transmits downlink signals to the mobile terminal via a downlink dedicated channel or a downlink shared channel.

* * * * *